United States Patent
Hanusiak et al.

[11] Patent Number: 6,077,066
[45] Date of Patent: Jun. 20, 2000

[54] TOOLING APPARATUS FOR COMPOSITE FABRICATION

[75] Inventors: Lisa B. Hanusiak, Candia, N.H.; Jeffrey M. Parnell, Chelmsford, Mass.; Steven R. Spear, Derry, N.H.; William M. Hanusiak, Derry, N.H.; Charles R. Rowe, Derry, N.H.

[73] Assignee: Atlantic Research Corporation, Gainesville, Va.

[21] Appl. No.: 08/755,048

[22] Filed: Nov. 22, 1996

[51] Int. Cl.[7] .............. B32B 31/20; B29B 15/08
[52] U.S. Cl. .................. 425/405.1; 264/571; 156/382; 425/389
[58] Field of Search .................. 425/389, 390, 425/405.1; 156/382; 264/571, 316

[56] References Cited

U.S. PATENT DOCUMENTS

| | | | |
|---|---|---|---|
| 2,636,539 | 4/1953 | Pajak | 425/62 |
| 3,072,225 | 1/1963 | Cremer et al. | 156/382 |
| 3,307,999 | 3/1967 | Boicey | 156/382 |
| 4,062,917 | 12/1977 | Hill et al. | 425/389 |
| 4,073,674 | 2/1978 | Hortel | 156/382 |
| 4,174,241 | 11/1979 | Rockar et al. | 264/571 |
| 4,314,013 | 2/1982 | Chang | 430/37 |
| 4,492,607 | 1/1985 | Halcomb | 156/242 |
| 4,504,341 | 3/1985 | Radzwill et al. | 156/382 |
| 4,517,147 | 5/1985 | Taylor et al. | 156/285 |
| 4,681,718 | 7/1987 | Oldham. | 264/548 |
| 4,886,442 | 12/1989 | McCowin et al. | 425/389 |
| 4,975,311 | 12/1990 | Lindgren | 425/405.1 |
| 5,089,328 | 2/1992 | Doerer et al. | 156/285 |
| 5,123,985 | 6/1992 | Evans et al. | 425/389 |
| 5,225,015 | 7/1993 | Allaire et al. | 264/570 |
| 5,260,137 | 11/1993 | Rosenthal et al. | 428/608 |
| 5,266,249 | 11/1993 | Grimes, III et al. | 264/258 |
| 5,298,102 | 3/1994 | Pohl | 425/405.1 |
| 5,316,462 | 5/1994 | Seemann | 425/389 |
| 5,368,807 | 11/1994 | Lindsay | 425/389 |
| 5,370,760 | 12/1994 | Mori et al. | 425/389 |
| 5,425,494 | 6/1995 | Rosenthal et al. | 228/124.5 |
| 5,427,304 | 6/1995 | Woods et al. | 228/193 |

FOREIGN PATENT DOCUMENTS

| | | | |
|---|---|---|---|
| 399578 | 10/1933 | United Kingdom | 264/316 |
| 1460449 | 1/1977 | United Kingdom | 425/389 |
| 2261627 | 5/1993 | United Kingdom | 156/382 |

*Primary Examiner*—Robert Davis
*Attorney, Agent, or Firm*—Sixbey, Friedman Leedom & Ferguson; Frank P. Presta; Joseph S. Presta

[57] ABSTRACT

The present invention relates to tooling for the fabrication of composite materials, particularly layered composite materials. The tooling apparatus encapsulates the composite material and uses an applied pressure, either atmospheric, induced gaseous or mechanical, to the material to retain it in place during off-gassing and/or consolidation.

8 Claims, 8 Drawing Sheets

VI - VI

TOOLING APPARATUS FOR COMPOSITE FABRICATION

FIELD OF THE INVENTION

The present invention is directed to a tooling apparatus for composite fabrication and, more particularly, to a tooling which encapsulates the composite material to be fabricated and holds it in place during fabricating processing steps such as off-gassing and consolidation.

BACKGROUND ART

In the prior art, it is known to consolidate composite materials comprising layers of fibers and a matrix together by first off-gassing the composite material followed by consolidation. These types of composite materials are shown in FIG. 1 wherein the composite material is designated by the reference numeral 10. The composite material 10 comprises a series of layered fibers 1 surrounded by a matrix 3.

Typically, the fibers 1 and matrix 3 are held together with an adhesive 5 in what is typically called a green form, see FIG. 2, reference numeral 20. The adhesives 5 are usually organic materials which have been dissolved in a solvent. The green form 20 is placed in a tool and is subjected to a vacuum to remove any moisture in the green form 20 as well as the organic material of the adhesive 5. The off-gas processing volatizes the water and adhesives by heating the green form to the appropriate volatizing temperature.

One of the problems with prior art tooling in this regard is the inability to allow the volatized water and adhesives to be removed while holding the composite material in place so that it can be subsequently consolidated. In prior art apparatus, the composite material is subjected to shifting which disrupts the orientation and spacing of the reinforcing materials therein, for example, the fibers 1 in the composite 10 of FIG. 1. With this disruption, the consolidated composite material has less than desirable product characteristics.

As such, a need has developed to provide an improved tooling apparatus which not only allows the volatized water and adhesives to be removed but also keeps the green form in place during off-gassing and consolidation.

Responsive to this need, the present invention provides a tooling apparatus which overcomes the deficiencies in the prior art apparatus discussed above. That is, according to the invention, the inventive tooling apparatus includes features which not only permit off-gassing to occur but also hold the composite material in place so that the composite can be subjected to both off-gassing and consolidation.

SUMMARY OF THE INVENTION

Accordingly, it is a first object of the present invention to provide a tooling apparatus for the fabrication of layered or composite materials.

A further object of the present invention is to provide a tooling apparatus which encapsulates the composite material to be off-gassed and consolidated by using means for applying pressure to the composite material during off-gassing and consolidation.

A still further object of the present invention is to provide a tooling apparatus which facilitates evacuating a tooling apparatus cavity for off-gassing.

Yet another object of the present invention is to provide an apparatus which utilizes atmospheric pressure as a loading means in combination with evacuation to hold or secure a composite material to be off-gassed and subsequently consolidated.

Other objects and advantages of the present invention will become apparent as a description thereof proceeds.

In satisfaction of the foregoing objects and advantages, the present invention provides, in its broadest sense, a vacuum tooling apparatus which utilizes a flexible bag, the flexible bag made of a metallic material having a low interstitial gas content. The bag forms a cavity which is sized to receive an organic material-containing composite material which is to be subjected to off-gassing and consolidation. The bag has a thickness and flexibility which permits atmospheric pressure to retain the composite material in place when the cavity is subjected to a vacuum. The tooling apparatus also includes at least one evacuation port in the bag to permit evacuation of the cavity. The bag is sealed along its periphery except for the one or more evacuation ports.

In one embodiment, the evacuation port comprises tubing which is attached to the flexible bag.

In a second embodiment, the evacuation port comprises an opening in the bag, the opening including means for connecting the opening to a vacuum source. With this embodiment, a quick connector is also provided which facilitates connecting the interior of the bag to the vacuum source.

In a third embodiment, the cavity receiving the composite material for evacuation is formed by a frame, plungers, an encapsulating bag and one or more evacuation ports. The frame surrounds the composite material to be off-gassed and consolidated. The plungers provide a loading force/restraint on the top and bottom of the composite material. The encapsulating bag in combination with the frame forms the cavity enclosing both the composite material and plungers for evacuation. Evacuation ports may be made part of the frame to evacuate the cavity. The frame also may include one or more spacers, generally in the configuration of a picture frame which provide thickness adjustment for the tooling apparatus to accommodate the plunger thicknesses as well as the green and final thicknesses of the composite material being fabricated.

In a fourth embodiment of the invention, the tooling apparatus described for the third embodiment is used in combination with another encapsulating bag. In this embodiment, one of the plungers is contained in an encapsulation bag which is then connected to the vacuum source via evacuation ports. The cavity which is evacuated in the third embodiment is pressurized in the fourth embodiment, the pressure in this cavity combining with the plunger enclosed in the evacuated encapsulating bag to retain the composite material in place during off-gassing and consolidation.

In a fifth embodiment of the invention, mechanical loading means are provided in conjunction with one or both of the plungers to adjust the loading on the composite material during evacuation. These mechanical loading means are used in the apparatus according to the third embodiment.

In a sixth embodiment, the tooling apparatus includes a base plate which can receive one or more composite materials. The composite materials are covered by an encapsulating sheet to form a cavity which can be evacuated similarly to that described for the first and second embodiments above. The encapsulating sheets are secured to the base plate via a sealing means. The base plate with the encapsulating sheets enclosing the composite materials are then mounted in a frame assembly similar to that disclosed in the fourth embodiment. The frame assembly is then pressurized to provide the necessary pressure on the evacuated cavities containing the composite material for off-gassing and consolidation.

BRIEF DESCRIPTION OF THE DRAWINGS

Reference is now made to the drawings of the invention wherein:

FIG. 3b is a top view of the embodiment depicted in FIG. 3a;

FIG. 4b is a top view of the embodiment of FIG. 4a;

FIG. 4c is an enlargement of detail A depicted in FIG. 4a;

Figure 6b is a sectional view along the line VI—VI of FIG. 6a;

FIG. 7b is a top view of the embodiment depicted in FIG. 7a;

DESCRIPTION OF THE PREFERRED EMBODIMENTS

In its broadest sense, the inventive tooling apparatus provides a way to retain a composite material in place during off-gassing and subsequent consolidation. A vacuum is formed in a space surrounding the composite material so that atmospheric pressure, an applied gaseous pressure, a mechanical loading or a combination thereof applied to the composite material holds it in place. The pressure from either the atmosphere, the applied gaseous pressure or the mechanical loading retains the composite material in place during off-gassing and subsequent consolidation. Thus, any movement of precisely aligned composite material components is avoided during both off-gassing and consolidation, thereby producing a high quality composite material.

It should be understood that the composite material which is adaptable for use with the inventive tooling apparatus can be any known composite material which is subjected to off-gassing and consolidation. Typically, these composite materials include a reinforcing material which could be either a fiber, whisker, powder or the like. The reinforcing materials could include carbon, silicon carbide, boron, alumina, graphite, silicon nitride. Generally, the reinforcing materials are combined with a matrix which could be metallic or non-metallic. Typical examples of matrix materials include aluminum, magnesium, titanium alloys or the like. It should be understood that the tooling apparatus of the invention is not limited to any specific type of composite material.

The techniques used to off-gas or consolidate the composite material when placed in the inventive tooling apparatus are also conventional in the art and require no further description for understanding of the invention. Any conventional type of off-gassing and/or consolidation processing can be utilized with the inventive tooling apparatus.

Figure 1:
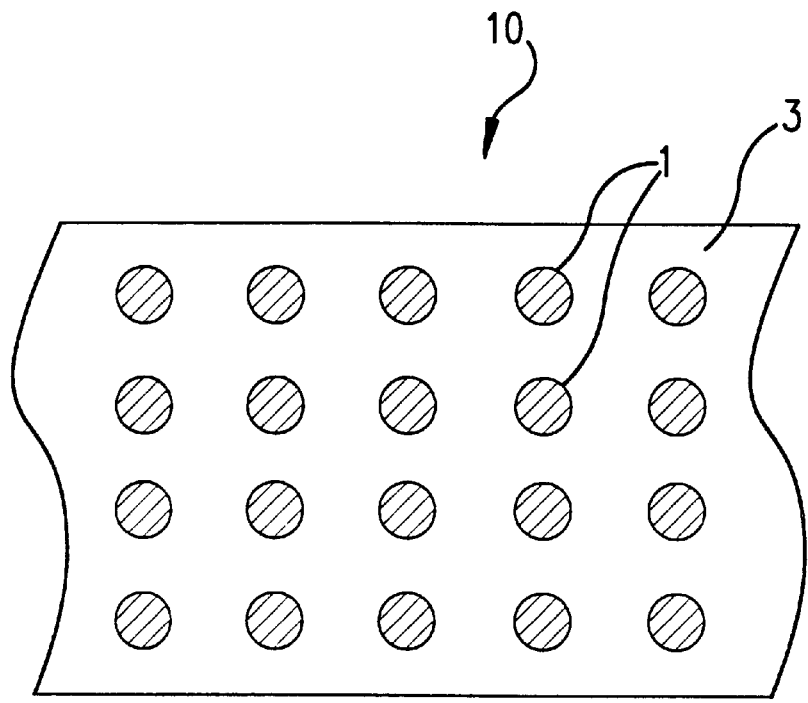
FIG. 1 is a sectional view of a composite material adaptable for use in the inventive tooling apparatus.
Figure 2:
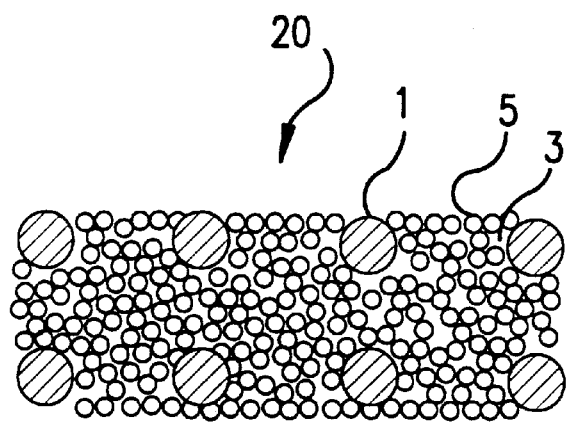
FIG. 2 is a sectional view of a green form the composite material of FIG. 1.
Figure 3A:
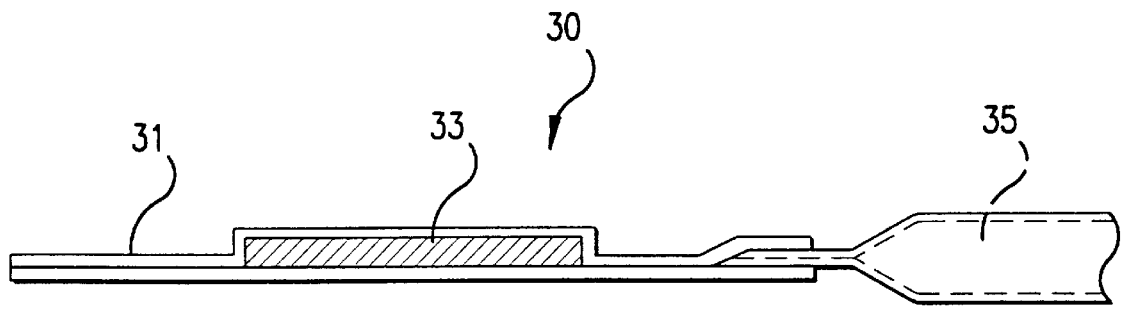
FIG. 3a is a sectional view of a first embodiment of the inventive tooling apparatus.
Figure 3B:
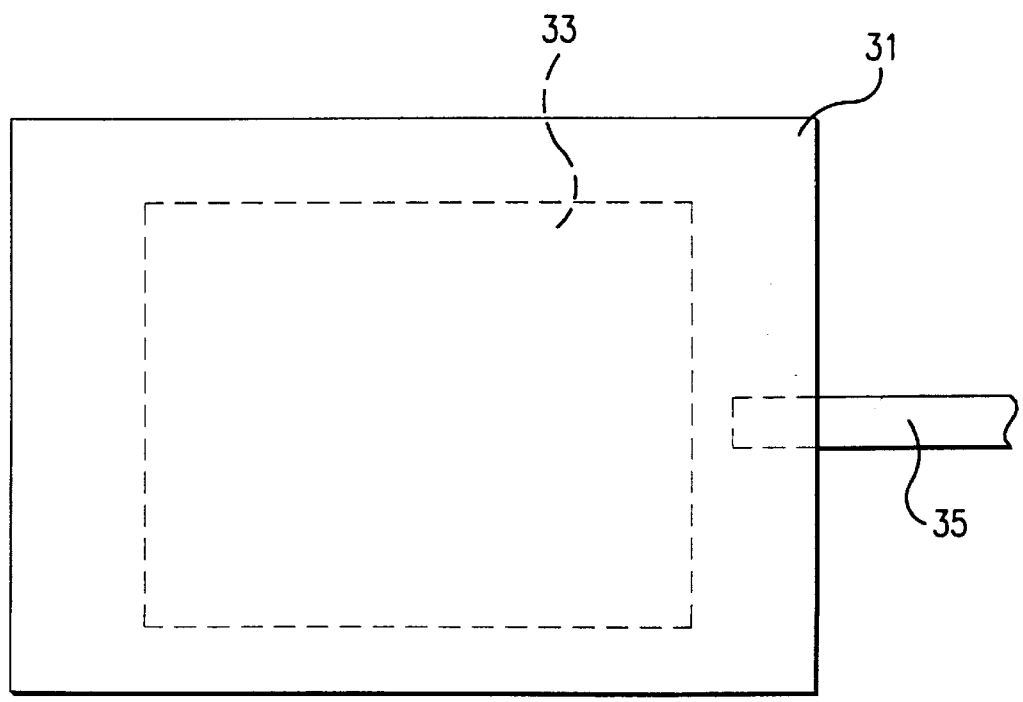
Figure 4A:
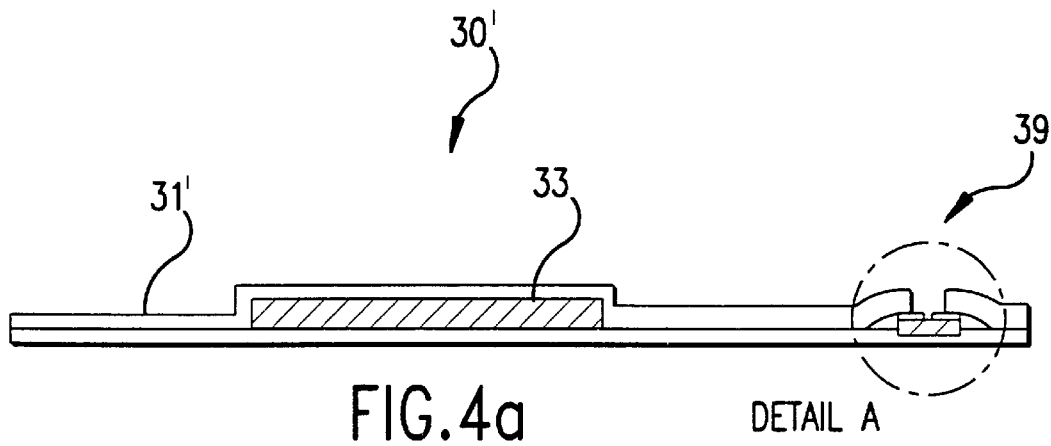
FIG. 4a is a sectional view of a second embodiment of the inventive tooling apparatus.
Figure 4B:
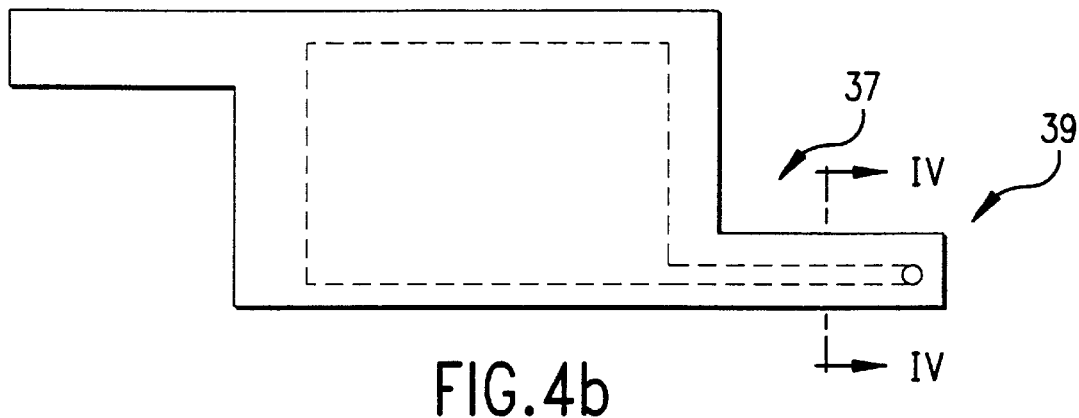
Figure 4C:
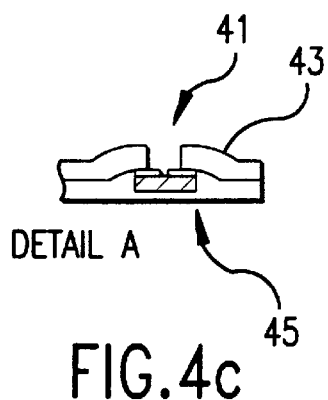
Figure 4D:
FIG. 4d is a sectional view along the lines from numeral IV—IV of FIG. 4b.

Referring now to FIGS. 3a and 3b, a first embodiment of the inventive tooling apparatus is generally designated by the reference numeral 30 and is seen to include a thin encapsulating bag 31 which contains a composite material preform 33. Also provided is an evacuation tube 35. Although one evacuation tube is shown, more than one can be used, if desired.

The encapsulating bag 31 and evacuation tube 35 are made of a ductile, low interstitial gas content material such as NICKEL 270 (99.97% Nickel minimum). For this application, a "low interstitial gas content material" is one that has less than 2,000 ppm total of a reactive gas therein. Typically, these reactive gasses include oxygen, nitrogen, carbon-containing gasses and hydrogen or hydrogen-containing gasses. The material of the inventive tooling apparatus should be a low interstitial gas content material so that when the material is subjected to a vacuum, the composite material is not adversely affected by any gas contained within the bag or tube material.

Typically, the encapsulating bags range from 0.002 to 0.060" thick, more preferably, 0.005" to 0.03". In a preferred embodiment, the encapsulating bag 31 is vacuum welded around its edge except where the evacuation tube 35 is attached. Prior to welding of the evacuation tube 35 to bag, the tube is flattened, see FIG. 3a, at one end thereof so that the portion of the tube which is inside the bag will not cause the bag to tear during subsequent processing.

Preferably, the encapsulating bag 31 should have the following characteristics:

1. Ductile enough at room temperature to form around the article being manufactured,
2. be available with a low interstitial gas content,
3. able to be welded to itself and to the off-gas tube material,
4. will not contaminate or alloy with the product material,
5. be available in the proper thickness range (0.002" to 0.060"), and
6. able to be withstand the processing temperature of the product without tearing or cracking.

The requirements of the evacuation tube material are the following:

1. ductile enough at room temperature to be flattened without cracking,
2. be available with a low interstitial gas content,
3. able to be welded to itself and the bag material,
4. able to be mechanically worked, e.g. hot or cold crimped to form a diffusion bond with itself, and
5. able to withstand the processing temperatures of the product without tearing or cracking.

Typically, the evacuation tube 35 is welded to one piece of the bag material followed by centering the composite material 33 on that piece. The second piece of bag material is then welded to the first piece and the evacuation tube. The encapsulating bag, when welded, must be helium-leak tight for the tool to work properly.

Once the encapsulating bag and evacuation tube are formed to be helium-leak tight, the evacuation bag forming a cavity for the composite material 33, the composite material is subjected to off-gassing to remove any adhesive, moisture or the like therefrom. When evacuating the encapsulating bag 31, atmospheric pressure on the encapsulating bag 31 causes the bag to form around the composite material 33, thereby locking it in place. Consequently, the composite material 33 is retained and no shifting of its components can occur during the off-gassing step.

Although welding is disclosed as one means for forming the cavity for the composite material, any known means can be used to form the leak tight cavity for receiving the composite material.

Referring now to FIGS. 4a–4d, a second embodiment of the inventive tooling apparatus is generally designated by the reference numeral 30". In this embodiment, the encapsulating bag 31' is formed with a leg 37, the distal end of the leg 37 including a means 39 for obtaining the internal vacuum described above. In this embodiment, evacuation of the bag 31' is achieved through a surface of the bag rather than an edge as described in the first embodiment shown in FIGS. 3a and 3b.

According to the second embodiment, the evacuation means 39 comprises an opening 41 in the bag top sheet 43. An O-ring seal 45 is provided around the hole. The O-ring seal 45 may also incorporate the use of a gasket and should be able to maintain a vacuum throughout the off-gassing process. The O-ring seal should also use an insert between the two pieces of bag material so that the vacuum can be applied to the composite material. The bag material must also be able to be sealed so that the composite material remains under vacuum after the O-ring seal is broken. The insert should be a material that can withstand the off-gassing process.

Figure 5:
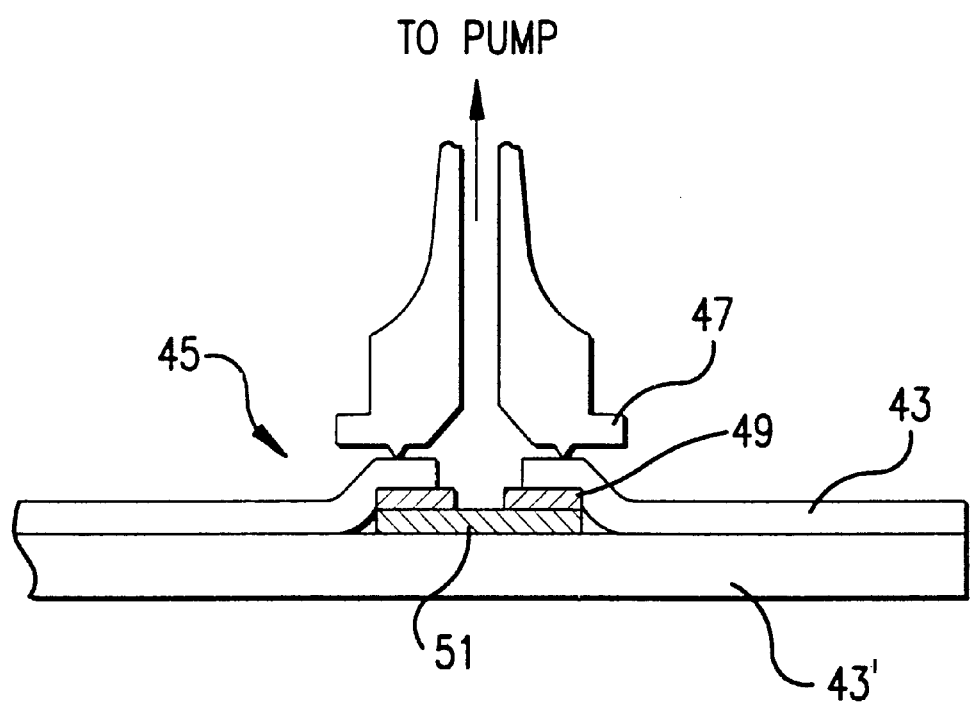
FIG. 5 is a sectional view of the evacuation port of FIG. 4a shown in an exemplary use.

Referring now to FIG. 5, an exemplary O-ring seal 45 is made with a metal O-ring connector 47 which is in direct contact with the encapsulating bag top sheet 43. Also provided is a two layer insert between the bag sheets 43 and 43' which includes a small piece of thin low interstitial gas content steel 49 and a piece of low interstitial gas content screen 51.

In use, the O-ring seal is made by squeezing the bag material 43 between the O-ring connector 47 and the two layer insert. The screen 51 permits evacuation.

Figure 6A:
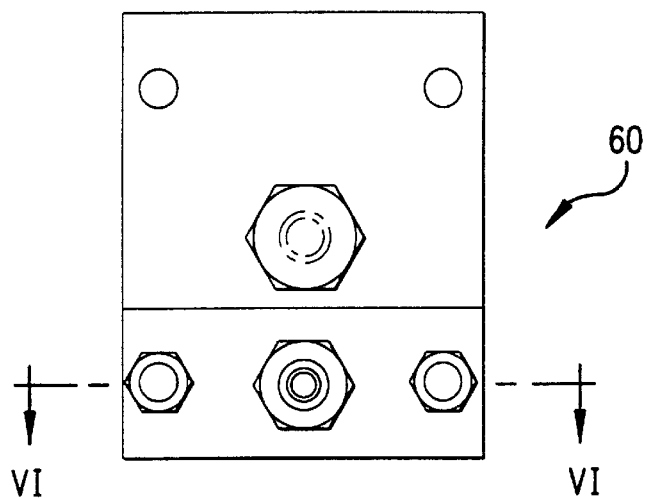
FIG. 6a is a top view of a quick connector for use in the second embodiment of the invention.
Figure 6B:
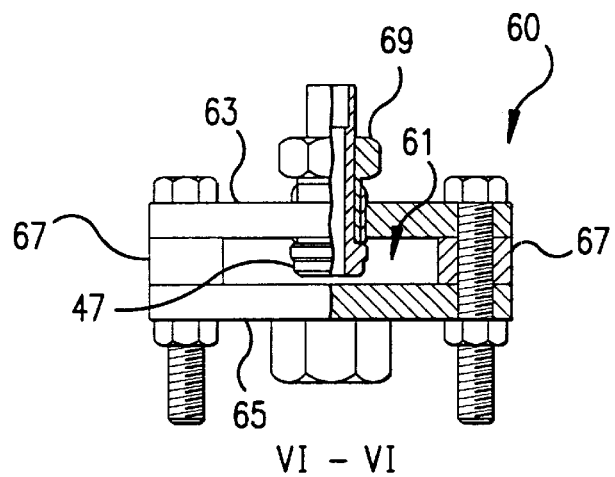
Figure 6C:
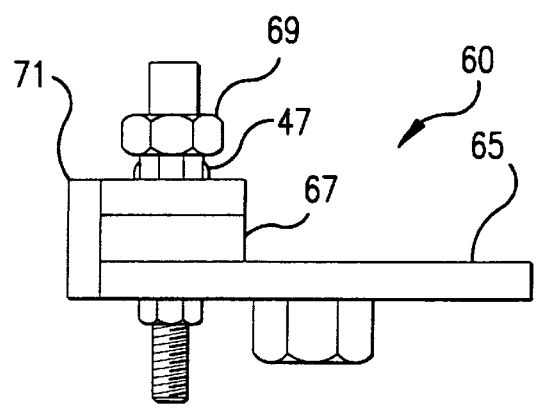
FIG. 6c is a side view of the quick connector shown in FIGS. 6a and 6b.

Although this squeezing can be done by any known means, a preferred sealing mechanism 60 is shown in FIGS. 6a–6c. In use, the leg 37 of the bag 31' is inserted into the cavity 61 formed by the top plate 63, bottom plate 65 and side members 67. The opening 41 is aligned with the bottom of the O-ring connector 47 and the nut 69 is tightened, the nut tightening compressing the bag leg 37 between the O-ring connector 47 and the plate 65. During this compression, the O-ring connector 47 compresses the bag material 43 to form the necessary seal for vacuum connection.

For ease in making the vacuum connection and vacuum integrity, the hole 41 should be positioned at a predetermined distance from the edges of the bag. This distance should correspond to the distance from the stop 71 to the end of the quick connector 47.

After off-gassing using this technique, the bag must be sealed so that the product will remain under vacuum. This sealing can be done by any method which will provide a helium leak tight seal such as ultrasonic welding, plasma arc welding, crimping or the like.

Figure 7A:
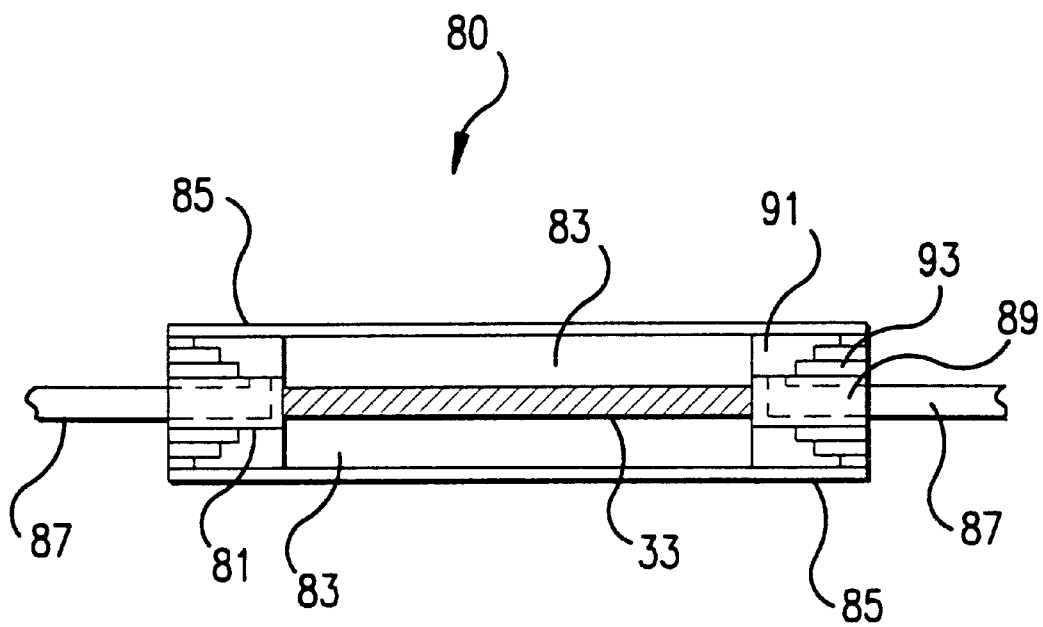
FIG. 7a is a sectional view of a third embodiment of the inventive tooling apparatus.
Figure 7B:
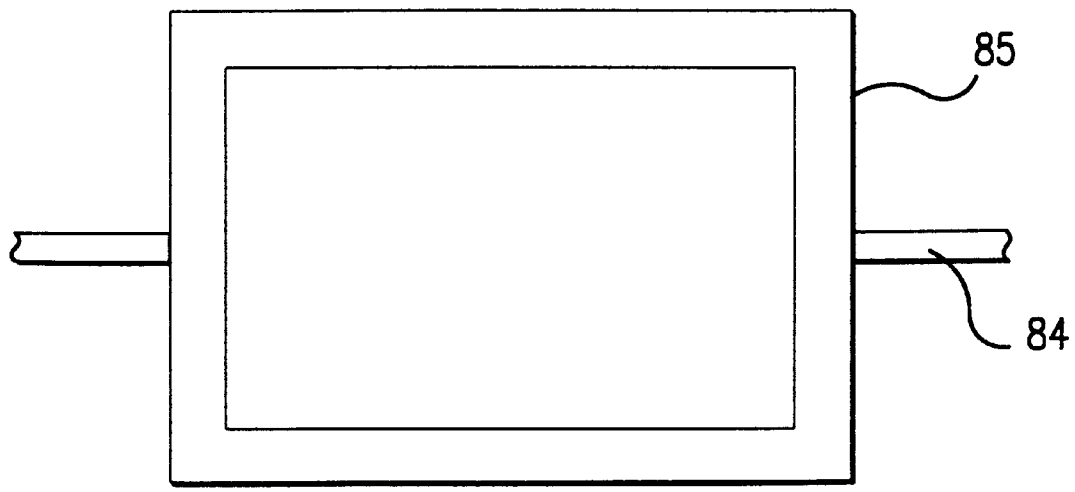

Referring now to FIGS. 7a and 7b, a third embodiment of the invention is generally designated by the reference numeral 80 and includes a frame 81, a pair of plungers 83, an encapsulating bag 85 and evacuation tubes 87. All materials of this embodiment are made from the low interstitial gas content material, e.g. a 620 steel or vacuum degassed 1018 steel.

The frame 81 can be a single piece of material which surrounds the composite material 33 but can also be made from four individual pieces that are welded together along the outside seams.

The plungers 83 can be stacked thin sheets or a single piece of plate stock. Encapsulating bags 85, typically 0.120" thick can also be made from multiple layers which are welded along the edge thereof. The vacuum tubes 87 are seamless-thick wall tubing which is welded to the frame. The frame 81 also includes a passageway 89 which allows for evacuation of the cavity 91 formed by the frame 81 and the encapsulating bag 85.

The apparatus 80 can also includes one or more strips of sheet material 93 which are picture frame in configuration and are disposed between the frame 81 and the bag 85. The strips 93 are made in thickness and number to accommodate the plunger thicknesses 83. Of course, the bag 85 could be welded to the appropriately sized frame 81 without the spacers 93, if desired.

The size of the apparatus 80 depends on the number and the green and final thicknesses of the composite material 33 being fabricated. The total green stack thickness and final stack thickness, including plungers and any spacers is calculated. The frame thickness is chosen so that there is a minimal interference between the plunger and the frame.

The requirements for the frame, the plunger, the bag and the evacuation tubes are the same as that disclosed for the first embodiment except that the bag does not need the ductility required in the first embodiment.

According to this embodiment, during off-gassing the frame which surrounds the composite material 33 and the plungers which provide a loading on the top and/or bottom prevent the composite material 33 from movement during off-gassing. The frame 81 prevents movement by its physical presence surrounding the composite material with the plunger doing this via the atmospheric pressure applied thereto via the encapsulating bag 85.

After off-gassing, the evacuation tubes 87 are crimped and sealed to maintain the vacuum inside the tool.

Figure 8:
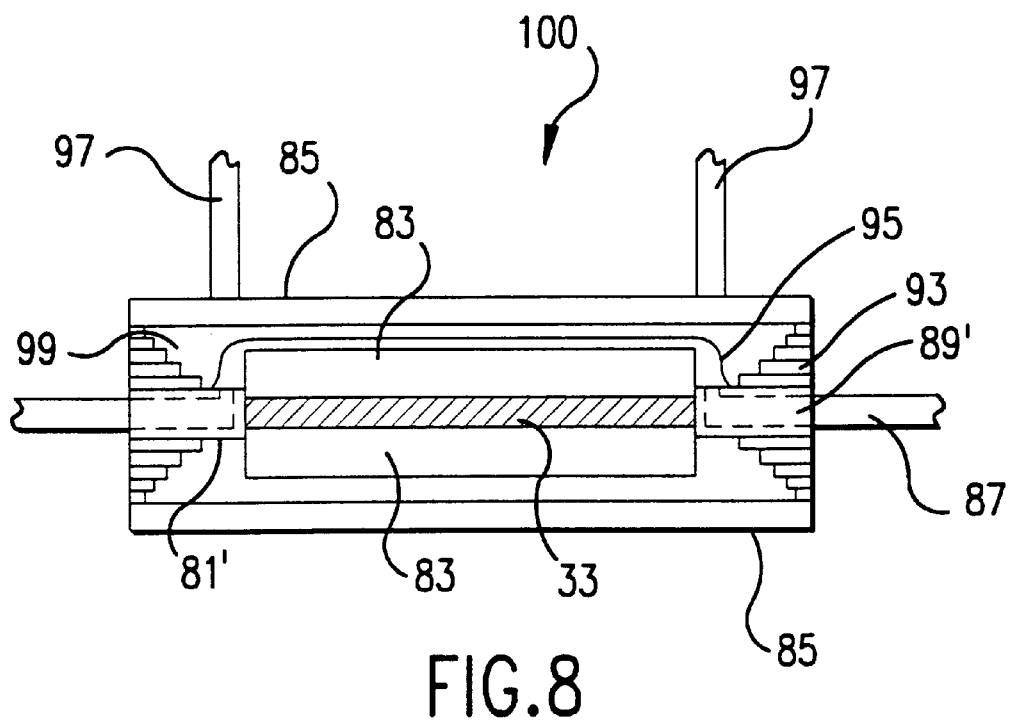
FIG. 8 is a sectional view of a fourth embodiment of the inventive tooling apparatus.

Referring now to FIG. 8, a fourth embodiment of the invention is generally designated by the reference numeral 100. The fourth embodiment is a combination of the second and third embodiments discussed above. In this apparatus, the composite material 33 is again situated between the frame 81' and the plungers 83. In this embodiment, a second encapsulating bag 95 is disposed on the frame 81' so as to enclose the plunger 83. The frame 81' has a passageway 89' which connects the cavity formed by the encapsulating bag 95 to the vacuum tube 87.

The outer bag 85 is welded over the inner bag 95 and has ports 97 which allow for either evacuation or pressurization of the volume 99 between the bags 85 and 95.

The inner bag 95 must also meet the requirements of the bag material as outlined for the first embodiment. The outer bag should meet the requirements of the bag specified for third embodiment, both inner and outer bags being helium leak tight. In this embodiment, there should be a space between the inner and outer bags since the volume 99 is pressurized to atmospheric pressure with inert gas during off-gassing. This pressurization assists retaining the composite material 33 in place during off-gassing along with the plunger 83 and evacuation of bag 95.

Figure 9:
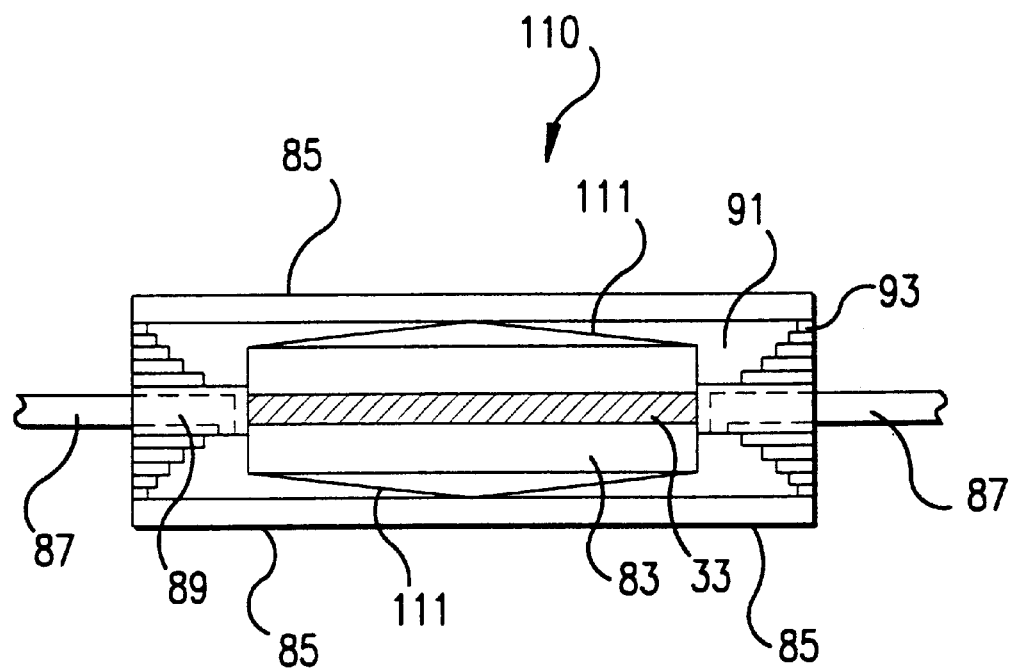
FIG. 9 is a sectional view of a fifth embodiment of the inventive tooling apparatus.

Referring now to FIG. 9, a variation of the fourth embodiment is generally designated by the reference numeral 110. In this embodiment, a clamping force can be applied to the plungers 83, the clamping force independently adjustable from the induced atmospheric force. More specifically, bent metal sheets 111, typically 0.030", are placed between the plungers 83 and the outer bags 85. The bent metal sheets 111 are positioned in such a way so as to apply a constant spring force to the plungers but not allow direct contact between the outer bags and plungers. In this embodiment, the volume 91 can be evacuated as described in the embodiment depicted in FIG. 7a in combination with applying a mechanical force against the plungers 83 by reason of the bent metal sheets 111. It should be understood that the sheet material gauge can be varied to vary the applied spring force as is well known in the art.

Figure 10:
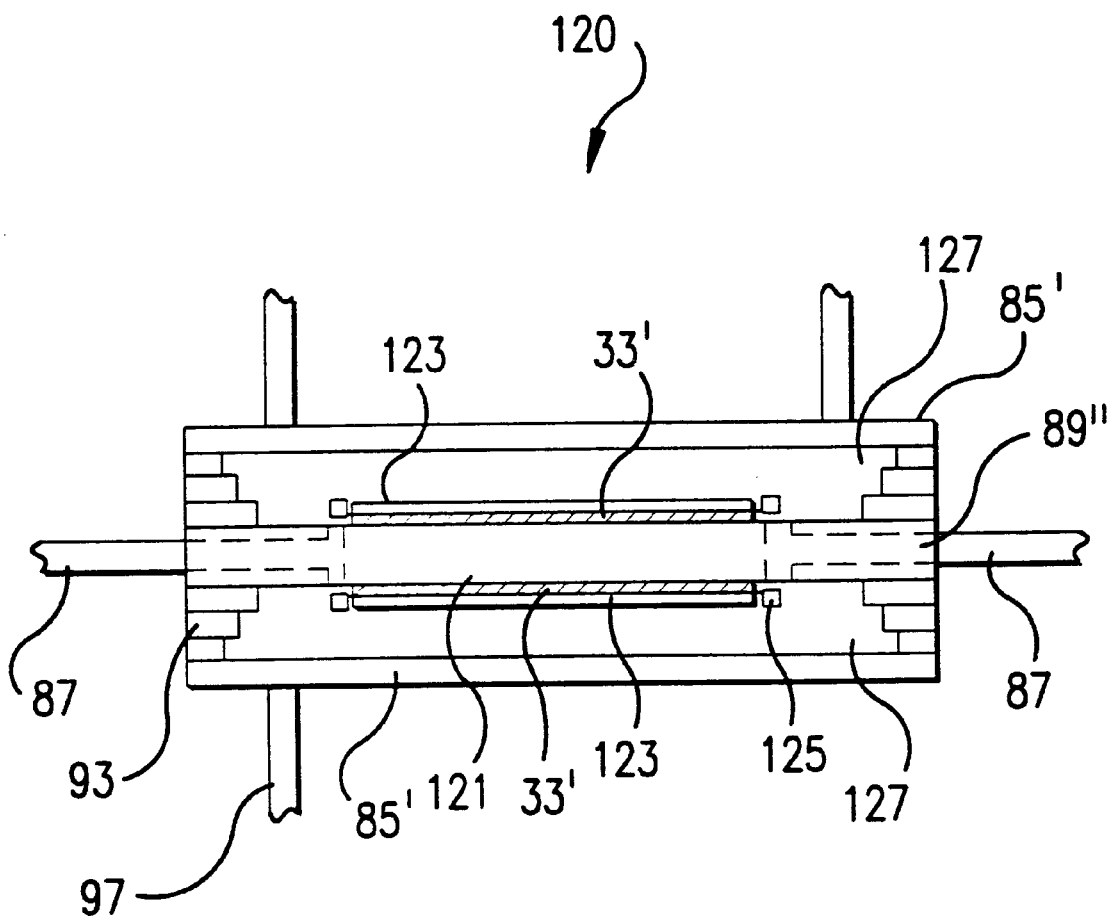
FIG. 10 is a sectional view of a sixth embodiment of the inventive tooling apparatus.

Referring now to FIG. 10, a sixth embodiment of the invention is generally designated by the reference numeral 120. In this embodiment, a base plate 121 is provided, the base plate 121 acting as a support for the composite sheets 33'. Covering each of the composite sheets 33' is a low interstitial gas thin foil 123, the thin foil secured to the base plate 121 via the metal strip 125. The metal strip 125 facilitates forming a weld seal of the foil 123 to the base plate 120. With this weld seal, a cavity is formed by the foil 123 and base plate 121 which can be evacuated.

The passageway 89" in the base plate 121 provides communication for the evacuation of the cavity via the vacuum tubes 87.

The encapsulating bags 85' in combination with the spacers 93 and base plate 121 form the chamber 127 which can be either pressurized or evacuated via the ports 97.

As with embodiments 4 and 5, the chamber 127 can be pressurized so as to apply a loading on the foils 123 to retain the composite materials 33' in place during off-gassing and/or consolidation.

Typically, the base plate 121 would have a thickness between 0.06 and 1.51" and the thin foil 123 would be a nickel titanium or stainless steel. Although a pair of composite materials 33' are shown in FIG. 10, the tool 120 could be used with only a single composite material 33'. When using only a single composite material, the base plate thickness should be in the upper end of the range described above in order to maintain its flatness.

As such, an invention has been disclosed in terms of preferred embodiments thereof which fulfill each and every one of the objects of the present invention as set forth herein above and provides a new and improved vacuum tooling apparatus for off-gassing and consolidation of composite materials.

Of course, various changes, modifications and alterations from the teachings of the present invention may be contemplated by those skilled in the art without departing from the intended spirit and scope thereof. Accordingly, it is intended that the present invention only be limited by the terms of the appended claims.

We claim:

1. An off-gassing and consolidation tooling apparatus for a composite material comprising:

a) a frame sized to peripherally surround said composite material;

b) a pair of plungers sized to contact upper and lower surfaces of said composite material;

c) encapsulating sheets attached to said frame, said encapsulating sheets and said frame forming a cavity containing said plungers and said composite material; and d) at least one evacuation port in communication with said cavity for evacuating said cavity wherein atmospheric pressure on said encapsulation sheets and the mass of said plungers hold said composite material in place during said evacuating;

e) wherein said frame, plungers, encapsulating sheets and evaluation port are each made of a material having a low interstitial gas content.

2. The tooling apparatus of claim 1 wherein said at least one evacuation port is a tubing connected to a passageway in said frame which is in communication with said cavity.

3. The tooling apparatus of claim 1 further comprising at least one spacer positioned between said frame and a respective one of said encapsulating sheets, said spacer, said frame and said encapsulating sheets forming said cavity.

4. The tooling apparatus of claim 1, wherein said material is metal.

5. The tooling apparatus of claim 4, wherein said metal is titanium.

6. The tooling apparatus of claim 4, wherein said metal is steel.

7. The tooling apparatus of claim 3, wherein said encapsulating sheet is spring loaded against said plungers in a manner which maintains a compressive loading on said composite material when said composite material is consolidated.

8. The tooling apparatus of claim 7, wherein said spacer is used to cause said spring loading of said encapsulating sheet.

* * * * *